(12) United States Patent
Weber et al.

(10) Patent No.: US 12,014,522 B2
(45) Date of Patent: Jun. 18, 2024

(54) CAMERA EXTRINSIC CALIBRATION VIA RAY INTERSECTIONS

(71) Applicant: Magic Leap, Inc., Plantation, FL (US)

(72) Inventors: Joseph W. Weber, Reno, NV (US); Zhiheng Jia, Weston, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/100,416

(22) Filed: Jan. 23, 2023

(65) Prior Publication Data

US 2023/0206498 A1 Jun. 29, 2023

Related U.S. Application Data

(63) Continuation of application No. PCT/US2021/043553, filed on Jul. 28, 2021.

(60) Provisional application No. 63/058,242, filed on Jul. 29, 2020.

(51) Int. Cl.
| | |
|---|---|
| *G06T 7/80* | (2017.01) |
| *G06V 10/74* | (2022.01) |
| *H04N 13/246* | (2018.01) |
| *H04N 23/695* | (2023.01) |

(52) U.S. Cl.
CPC .............. *G06T 7/80* (2017.01); *G06V 10/761* (2022.01); *H04N 13/246* (2018.05); *H04N 23/695* (2023.01); *G06T 2207/10024* (2013.01)

(58) Field of Classification Search
CPC ............ G06T 7/80; G06T 2207/10024; G06V 10/761; H04N 23/695; H04N 17/002; H04N 13/246; H04N 13/327
See application file for complete search history.

(56) References Cited

U.S. PATENT DOCUMENTS

| | | | | |
|---|---|---|---|---|
| 9,161,027 | B2 * | 10/2015 | Lee | G06T 7/80 |
| 10,547,833 | B2 * | 1/2020 | Kranski | H04N 17/002 |
| 10,666,926 | B1 * | 5/2020 | El Dokor | H04N 13/246 |
| 11,206,378 | B2 * | 12/2021 | Wang | G06T 7/70 |
| 11,488,322 | B2 * | 11/2022 | Liu | G06T 7/75 |
| 11,721,040 | B2 * | 8/2023 | Koyama | H04N 23/695 |
| | | | | 702/94 |
| 11,748,905 | B2 * | 9/2023 | Zhou | G06T 7/74 |
| | | | | 382/103 |
| 11,881,001 | B2 * | 1/2024 | Myokan | H04N 25/61 |

(Continued)

OTHER PUBLICATIONS

Application No. PCT/US2021/043553, "International Preliminary Report on Patentability", dated Feb. 9, 2023, 8 pages.

(Continued)

*Primary Examiner* — Brian P Yenke
(74) *Attorney, Agent, or Firm* — KILPATRICK TOWNSEND & STOCKTON LLP

(57) ABSTRACT

Embodiments provide image display systems and methods for extrinsic calibration of one or more cameras. More specifically, embodiments are directed to camera extrinsic calibration approach based on determining intersection of the rays projecting from the optical centers of the camera and a reference camera. Embodiments determine the relative position and orientation of one or more cameras given image(s) of the same target object from each camera by projecting measured image points into 3D rays in the real world. The extrinsic parameters are found by minimizing the expected 3D intersections of those rays with the known 3D target points.

20 Claims, 17 Drawing Sheets

(56) References Cited

U.S. PATENT DOCUMENTS

| | | | | |
|---|---|---|---|---|
| 2012/0093393 A1* | 4/2012 | Robert | ............. | G06T 7/85 |
| | | | | 382/154 |
| 2013/0194418 A1* | 8/2013 | Gonzalez-Banos | ....... | G06T 7/20 |
| | | | | 348/135 |
| 2016/0300113 A1* | 10/2016 | Molin | ............. | H04N 23/90 |
| 2017/0091996 A1* | 3/2017 | Wei | ............. | G06T 7/50 |
| 2017/0132774 A1* | 5/2017 | Ruprecht | ............. | H04N 17/002 |
| 2019/0082156 A1 | 3/2019 | Zhang et al. | | |
| 2019/0147625 A1* | 5/2019 | Jia | ............. | G06T 7/80 |
| | | | | 348/187 |
| 2019/0156501 A1 | 5/2019 | Le Guilloux | | |
| 2019/0197734 A1 | 6/2019 | Briggs | | |
| 2019/0295291 A1 | 9/2019 | Raag et al. | | |
| 2020/0106960 A1* | 4/2020 | Aguilar | ............. | H04N 17/002 |
| 2020/0111232 A1* | 4/2020 | Bleyer | ............. | G06V 20/10 |
| 2021/0082149 A1* | 3/2021 | Sheorey | ............. | G06T 3/4007 |
| 2022/0264072 A1* | 8/2022 | Anderberg | ............. | H04N 23/67 |
| 2022/0292720 A1* | 9/2022 | Raag | ............. | H04N 13/246 |
| 2022/0318949 A1* | 10/2022 | Li | ............. | G06V 20/56 |
| 2022/0394183 A1* | 12/2022 | Nagai | ............. | H04N 23/695 |
| 2023/0086050 A1* | 3/2023 | Feldman | ............. | H04N 17/002 |
| | | | | 382/154 |
| 2023/0377197 A1* | 11/2023 | Napolskikh | ............. | G01C 11/06 |

OTHER PUBLICATIONS

Application No. PCT/US2021/043553, "International Search Report and Written Opinion", dated Nov. 17, 2021, 9 pages.

* cited by examiner

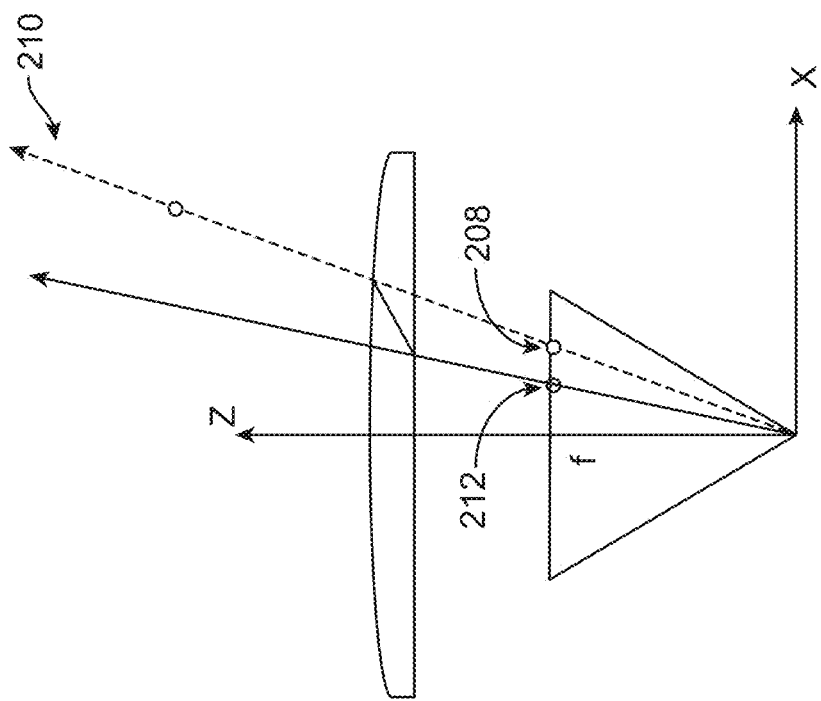
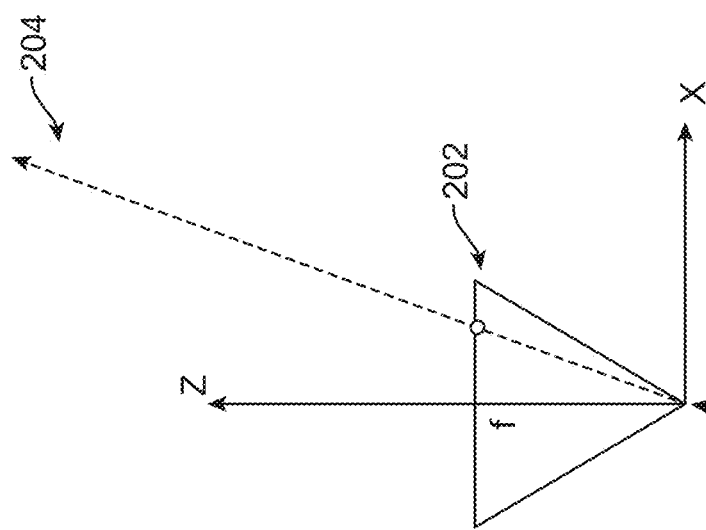
FIG. 2B
FIG. 2A

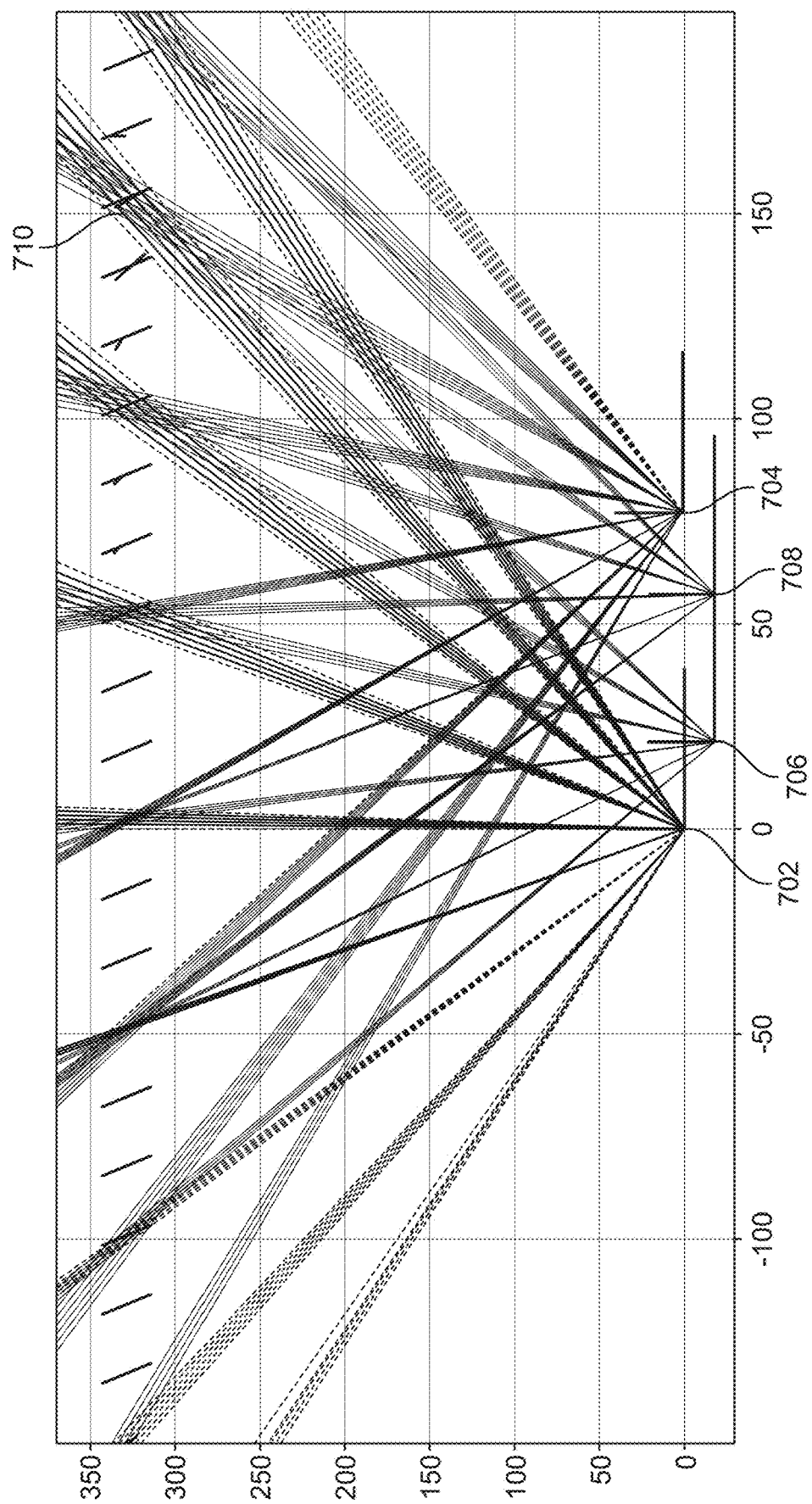

| Model | RotationAngles | | | Translation (mm) X | Y | Z |
|---|---|---|---|---|---|---|
| | | (degrees) | | | | |
| Traditional | 0.3305495 | 0.511984186 | -0.3837513 | 131.0933276 | -0.4410306 | 0.202327903 |
| stdev | 0.0031082 | 0.012779765 | 0.11891315 | 0.758063214 | 0.028838495 | 0.205391609 |
| Projection | 0.2613 | 0.517855244 | -0.4129015 | 131.8483267 | -0.393391611 | 0.26254909 |
| stdev | 0.0030358 | 0.003176489 | 0.01796099 | 0.13195683 | 0.020128554 | 0.049084419 |

FIG. 8

| | Model | Rotation (Roll, Pitch, Yaw, degrees) | | | Translation (mm) X | Y | Z | PlanarVariance (mm) |
|---|---|---|---|---|---|---|---|---|
| Warped Board | | | | | | | | |
| 902 | Traditional | 0.2086412 | 0.9086357 | -0.0680607 | 131.1091164 | 0.692534704 | 0.487456226 | N/A |
| | stdev | 0.0155243 | 0.0023950 | 0.00363078 | 0.033011144 | 0.093857197 | 0.026908152 | |
| 904 | Projection | 0.4204457 | 0.9247114 | -0.0744016 | 131.8196664 | 0.576955004 | 0.058726724 | 0.809336175 |
| | stdev | 0.0027829 | 0.0005487 | 0.00321647 | 0.020218146 | 0.016868968 | 0.014173153 | |
| Flatter Board | | | | | | | | |
| 902 | Traditional | 0.2070114 | 0.8902212 | -0.2702075 | 132.2345768 | 0.739457288 | 0.645370705 | N/A |
| | stdev | 0.0180220 | 0.0056853 | 0.00606968 | 0.061532327 | 0.097615232 | 0.02154629 | |
| 904 | Projection | 0.4059221 | 0.9192053 | -0.0734284 | 131.7895955 | 0.568796075 | 0.030715805 | 0.570493758 |
| | stdev | 0.0049552 | 0.0013615 | 0.00893031 | 0.027006618 | 0.033301071 | 0.014307505 | |

FIG. 9

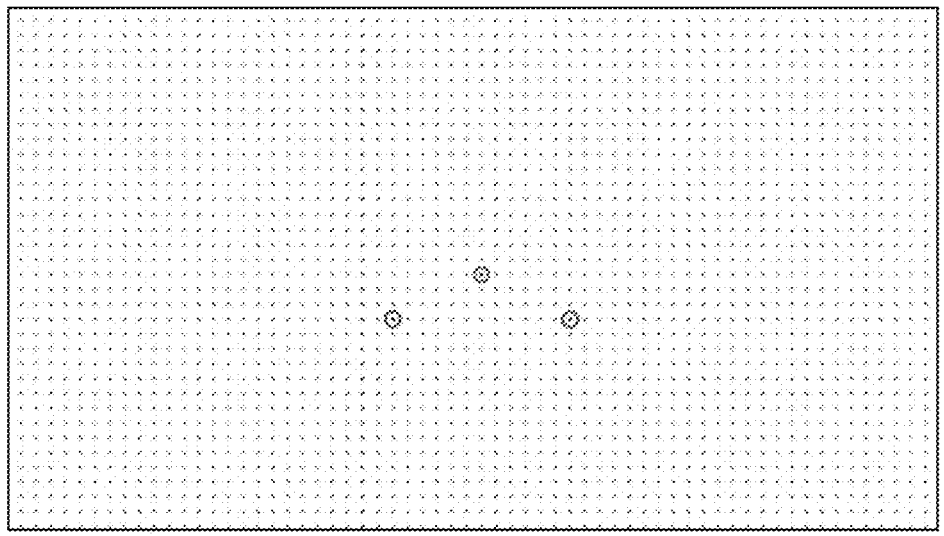
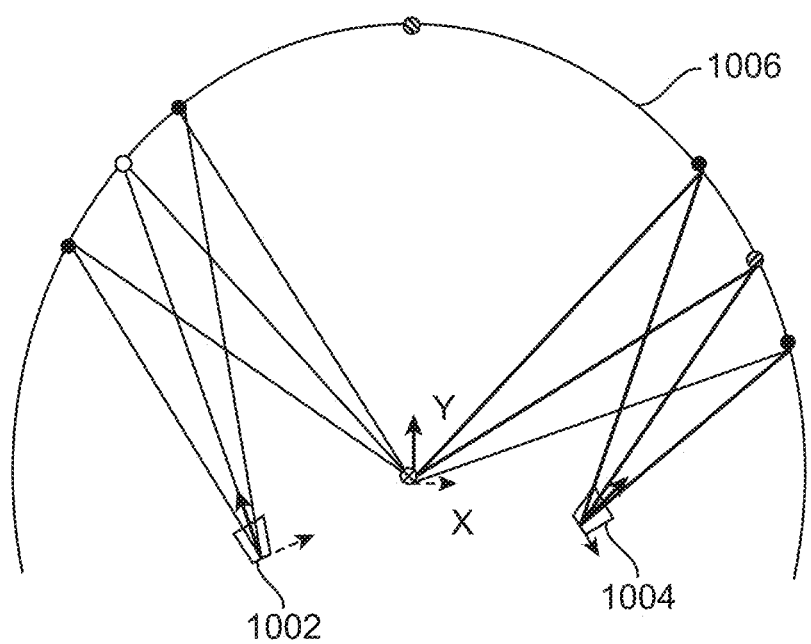
FIG. 10

Table 2

| Device 1 | Num Frames | Euler Angles (Degrees) | | | Translation X(mm) | Translation Y(mm) | Translation Z(mm) |
|---|---|---|---|---|---|---|---|
| With Planar Err | 9 | 0.363923 | -0.04589 | 0.91791914 | 131.6385317 | 0.404663852 | 0.042183326 |
| Without planar Err | 9 | 0.396262 | -0.08629 | 0.919988299 | 131.8368015 | 0.555651518 | 0.068921334 |
| Device 2 | Num Frames | Euler Angles (Degrees) | | | Translation X(mm) | Translation Y(mm) | Translation Z(mm) |
| With Planar Err | 9 | 0.267328 | -0.20124 | 0.243015018 | 131.8783933 | -1.575528528 | 0.377626789 |
| Without planar Err | 9 | 0.270644 | -0.24085 | 0.24377601 | 132.0845033 | -1.556788359 | 0.394963269 |
| Device 3 | Num Frames | Euler Angles (Degrees) | | | Translation X(mm) | Translation Y(mm) | Translation Z(mm) |
| With Planar Err | 9 | 0.175937 | -0.36754 | 0.511420555 | 131.682704 | -0.858458829 | 0.213988568 |
| Without planar Err | 9 | 0.232149 | -0.39762 | 0.510771148 | 131.8389236 | -0.568673347 | 0.24116602 |

FIG. 13

Table 3

| Using One Pose (39 samples) | | | | |
|---|---|---|---|---|
| mean | 61.97021 | -0.4491 | 0.35837 | -0.07362 | -0.65883 | 0.053507 |
| stddev | 0.21885 | 0.11595 | 0.09594 | 0.01046 | 0.00533 | 0.01835 |
| Using Three Poses (75 samples) | | | | |
| mean | 62.09841 | -0.22728 | 0.37951 | -0.05248 | -0.66006 | 0.04296 |
| stddev | 0.07663 | 0.02672 | 0.01530 | 0.00241 | 0.0015 | 0.00668 |
| Using Four Poses (37 samples) | | | | |
| mean | 62.017077 | -0.20566 | 0.34963 | -0.05109 | -0.65883 | 0.049769 |
| stddev | 0.0472273 | 0.0143 | 0.00965 | 0.00114 | 0.00112 | 0.00426 |
| Using Five Poses (77 samples) | | | | |
| mean | 62.009369 | -0.20725 | 0.34776 | -0.051258 | -0.65859 | 0.050399 |
| stddev | 0.046197 | 0.01546 | 0.00899 | 0.001257 | 0.00105 | 0.00412 |

FIG. 14

CAMERA EXTRINSIC CALIBRATION VIA RAY INTERSECTIONS

CROSS-REFERENCES TO RELATED APPLICATIONS

This application is a continuation of International Patent Application No. PCT/US2021/043553, filed Jul. 28, 2021, entitled "CAMERA EXTRINSIC CALIBRATION VIA RAY INTERSECTIONS," which claims the benefit of and priority to U.S. Provisional Patent Application No. 63/058,242, filed Jul. 29, 2020, entitled "CAMERA EXTRINSIC CALIBRATION VIA RAY INTERSECTIONS," the entire disclosures of which are hereby incorporated by reference, for all purposes, as if fully set forth herein.

BACKGROUND

Modern computing and display technologies have facilitated the development of systems for so-called "virtual reality" or "augmented reality" experiences, wherein digitally produced images or portions thereof are presented in a wearable device to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in VR and AR systems, there is a need in the art for improved methods and systems for camera calibration.

SUMMARY

Embodiments relate generally to image display systems and methods for display system calibration. Embodiments provide a camera extrinsic calibration approach, which is based on determining intersection of the rays projecting from the optical centers of at least one camera and a reference camera. Embodiments determine the relative position and orientation of one or more cameras given image(s) of the same 3D points (e.g. a target object) from each camera by projecting measured image points into 3D rays in the real world. The extrinsic parameters are found by minimizing the expected 3D intersections of the rays with the known 3D target points.

Embodiments provide a method for determining extrinsic parameters of a plurality of cameras. The method includes acquiring a first image of a target object using a first camera of the plurality of cameras, and acquiring a second image of the target object using a second camera of the plurality of cameras. A plurality of first image points are identified on an image plane of the first camera using the first image. Each of the plurality of first image points correspond to one of a plurality of points on the target object. A first set of rays are formed such that each ray of the first set of rays originates from an optical center of the first camera and passes through one of the plurality of first image points. A plurality of second image points are identified on an image plane of the second camera using the second image. Each of the plurality of second image points correspond to one of the plurality of points on the target object. A second set of rays are formed such that each ray of the second set of rays originates from an optical center of the second camera and passes through one of the plurality of second image point. A first ray among the first set of rays corresponds to a second ray among the second set of rays when the first ray and the second ray pass through image points on respective image planes of the first camera and the second camera that correspond to a same point on the target object. The method further includes calculating, using a first value for extrinsic parameters, a closest point of intersection between each ray of the first set of rays and each corresponding ray of the second set of rays. The method also includes calculating, using the first value for the extrinsic parameters, a residual between: (1) a distance between adjacent closest points of intersection between adjacent rays; and (2) an actual distance between adjacent points of the plurality of points on the target object. The method also includes determining a value for the extrinsic parameters that reduces the closest point of intersection and the residual.

Embodiments provide a system for determining extrinsic parameters for a plurality of cameras. The system includes a first camera, a second camera and a processor coupled to the first camera and second camera/The first camera is configured to acquire a first image of a target object and form a first set of rays. Each ray of the first set of rays originates from an optical center of the first camera and passes through one of a plurality of first image points on an image plane of the first camera. Each of the plurality of first image points correspond to one of a plurality of points on the target object. The second camera is configured to acquire a second image of the target object and form a second set of rays. Each ray of the second set of rays originates from an optical center of the second camera and passes through one of a plurality of second image points on an image plane of the second camera. Each of the plurality of second image points correspond to one of the plurality of points on the target object. A first ray among the first set of rays corresponds to a second ray among the second set of rays when the first ray and the second ray pass through image points on respective image planes of the first camera and the second camera that correspond to a same point on the target object. The processor is configured to execute instructions to calculate, using a first value for extrinsic parameters, a closest point of intersection between each ray of the first set of rays and each corresponding ray of the second set of rays. The processor is further configured to execute instructions to calculate, using the first value for the extrinsic parameters, a residual between: (1) a distance between adjacent closest points of intersection between adjacent rays; and (2) an actual distance between adjacent points of the plurality of points on the target object. The processor is also configured to execute instructions to determine a value for the extrinsic parameters that reduces the closest point of intersection and the residual.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIGS. 2A-2B illustrate projection of one or more rays from an optical center of a camera according to various embodiments.

FIGS. 7A-7B illustrate a third exemplary use case including four cameras and one target object according to various embodiments.

FIG. 8 illustrates a table showing exemplary extrinsic parameters for two cameras using the conventional technique and the technique described herein according to various embodiments.

FIG. 9 illustrates a table showing exemplary extrinsic parameters for two cameras using the conventional technique and the technique described herein using a warped target object and a planar target object according to various embodiments.

FIG. 10 illustrates a curved target object and cameras in an optical device according to various embodiments.

FIG. 13 is a table illustrating estimated extrinsic parameters and the effect of the planarity constraint according to various embodiments.

FIG. 14 is a table illustrating results for the ray projection method and the effect of multiple poses according to various embodiments.

DETAILED DESCRIPTION

Figure 1A:
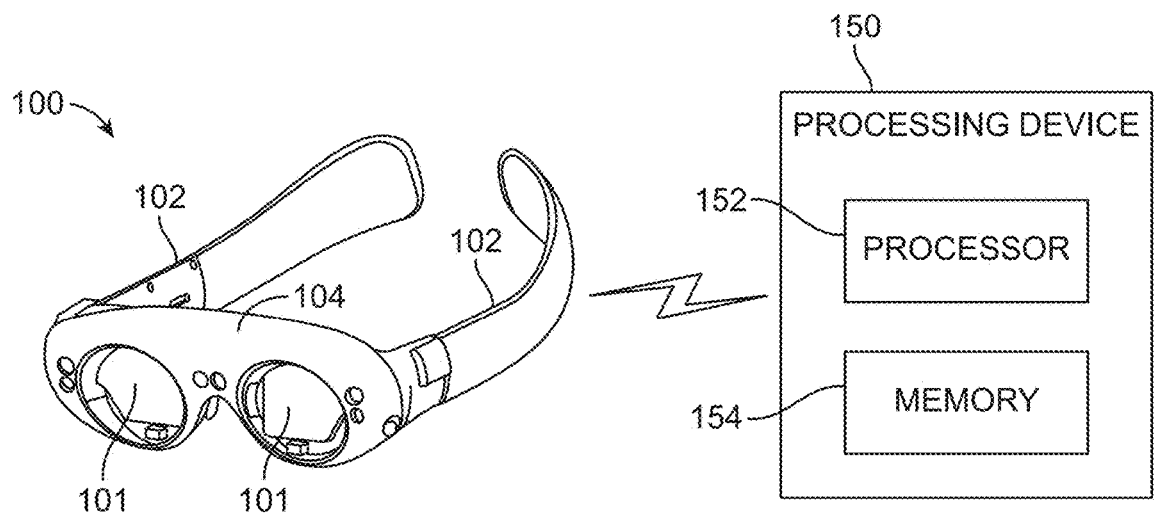
FIGS. 1A-1B show perspective views of an exemplary optical device according to various embodiments.

Embodiments are directed to image display systems and methods for extrinsic calibration of one or more cameras. More specifically, embodiments are directed to calculating extrinsic parameters of a first camera with respect to a second camera (e.g. the between-camera extrinsic parameters) by minimizing properties of the projection rays projecting from the camera centers in 3D space instead of 2D image space. The projection rays are unique half-infinite 3D rays passing through each 2D image point. For extrinsic calibration, the intersection of corresponding rays between cameras are identified in 3D space. Real distance between two intersection points is determined. The respective error therefore is a real world distance metric (as opposed to 2D re-projection error) that is independent of image size and pixel count. The pose of the target object is not calculated directly. Accordingly, using images of multiple target object angles does not increase the number of variable to minimize for. Furthermore, the target object is not required to be planar. If the target object is non-planar, that would be reflected in the error metric. Any planar fiducial mark pattern can be used as long as the distance between adjacent fiducial marks is known.

According to embodiments, a wearable device may include an augmented and/or virtual reality wearable (e.g. glasses). One or more cameras may be coupled to the wearable. In order to view the actual location of a real-world object on the augmented and/or virtual reality glasses, the one or more cameras need to be calibrated. Calibrating a camera may include determining extrinsic parameters of the camera. The extrinsic parameters of a camera may determine the location and orientation of the camera with respect to the world frame or another camera in the world frame. Accordingly, the camera calibration may estimate the rotation (R) and the translation (T) of the camera with respect to a reference point or object (e.g. another camera). The extrinsic parameters include the relative rotation and translation between cameras, which are necessary in applications such as depth estimation and structure from motion. The determined parameters may be used to determine the location of the camera in a scene in a 3-D scene reconstruction.

In many multi-camera applications (e.g. autonomous vehicles, robotics, augmented reality, structure from motion, video surveillance), it is important to get precise relative location and orientation of the cameras during calibration after manufacturing. It is usually not possible to measure the extrinsic parameters directly. The extrinsic parameters are obtained using images taken by the cameras of a fixed, planar target object.

Conventional camera calibration techniques attempt to minimize the pixel-based re-projection error of a set of known three-dimensional (3D) points, typically a checkerboard or similar pattern on a flat two-dimensional (2D) surface. This process requires estimating the relative pose of the 3D points by minimizing the re-projection of those points onto the images, turning known 3D points into measured 2D image points.

As it turns out, the human visual perception system is very complex, and producing a VR, AR, or a mixed reality "MR" technology that facilitates a comfortable, natural-feeling, rich presentation of virtual image elements amongst other virtual or real-world imagery elements is challenging. Systems and methods disclosed herein address various challenges related to VR, AR, and MR technology.

Figure 1B:
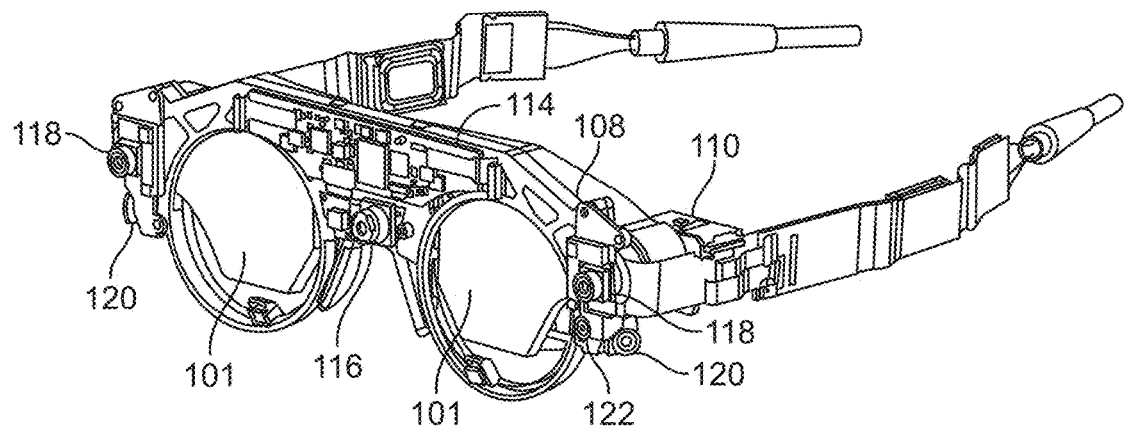

FIGS. 1A-1B show perspective views of a wearable device 100. The wearable device 100 may be a part of an AR/VR system. FIG. 1A shows wearable device 100 in a fully assembled state. Wearable device 100 defines two opening within which two eyepieces 101 can be held in precise registration with respect to one another and other components of wearable device 100. To accomplish this, a rigid internal frame is utilized to maintain the precise registration. The internal frame can then be coupled to a more flexible front band 104 that facilitates securing wearable device 100 to a user's head.

One of skill in the art will appreciate additional components and/or alternate locations of any particular component are of course possible, but not necessary to depict for purposes of understanding the embodiments. Wearable device 100 is depicted having arms 102 that are configured to extend past the ears of the user and wrap at least partially around the head of the user. It should be appreciated that in some embodiments, an optical device similar to wearable device 100 could have more conventional arms or temples 102. As depicted, arms 102 cooperate with front band 104 to secure wearable device 100 to the head of the user. Front band 104 can be formed of a material capable of deforming so that front band 104 is able to at least partially conform to the face of the user without deforming optics frame 108.

FIG. 1B shows a perspective view of optics frame 108 with multiple electronic components attached thereto. FIG. 1B depicts projectors 110 and their position relative to optics frame 108, though other configurations of projectors 110 are possible. For example, projector 110 could be positioned between eyepieces 101. Optics frame 108 can be made from a material much stronger and with a higher elastic modulus than the material used to form the more flexible front band 104, such that in some embodiments external factors may deform front band 104 without deforming optics frame 108. In such embodiments, front band 104 can be characterized as absorbing these external factors such as temperature effects or load effects to preserve the material status of optics frame 108 and the stability of the components it houses. For example, front band 104 can be formed from a machined aluminum alloy, while optics frame 108 can be formed from magnesium or titanium alloys. In some embodiments, front band 104 can be coupled to both arms 102 and attached to a central region of optics frame 108. For this reason, any symmetric forces applied to front band 104 or arms 102 can result in little or no deformation of optics frame 108. This configuration essentially allows optics frame 108 to float within and be protected by front band 104 and arms 102.

The electronic components include a central printed circuit board (PCB) 114, which is affixed to a bridge region of optics frame 108. In some embodiments, central PCB 114 can include one or more processors configured to execute instructions for operating wearable device 100. For example, the processor(s) can be configured to provide instructions to projectors 110. Many other electronic devices can also be coupled to optics frame 108. Sensors in particular can benefit from being coupled to optics frame 108 on account of the rigidity of optics frame 108 being able to maintain the position of the sensors in precise alignment with other sensors or eyepieces 101 during operation of wearable device 100. The sensors can include but are not limited to a depth sensor 116, front-facing world cameras 118, lateral-facing world cameras 120 and a photo camera 122. In some embodiments, a world camera is an outward-looking video camera configured to help characterize the area around a user of wearable device 100 so that augmented reality imagery projected through eyepieces 101 can be more realistically displayed and in some cases interact with the real world around it. Consequently, any misalignment of the sensors characterizing the outside world can result in the augmented reality imagery projected by projectors 110 being noticeably shifted out of place with respect to corresponding real-world objects. Furthermore, any changes in pitch, yaw or roll of eyepieces 101 with respect to each other during use can seriously degrade binocular calibration, resulting in serious imaging problems.

Other electronic components are also depicted in FIG. 1B. For example, a number of circuit boards and flexible circuits are depicted extending from each side of optics frame 108 and are arranged to fit within an interior volume defined by a respective one of arms 102.

As further illustrated in FIG. 1A, the world cameras 118, 120 may send the acquired pictures to a processing device 150 for further processing and rendering. The processing device 150 may include, among other components, a processor 152 and a memory 154 storing instructions that, when executed by the processor 152, cause the processor to perform the methods described herein. According to various embodiments, the acquired pictures may be used for extrinsic calibration of the world cameras 118, 120.

According to conventional techniques, the extrinsic parameters between two cameras are determined using a target object with known 3D point locations (e.g. corners of a checkerboard). Given images of the target object with known 3D point locations, the 'pose' (R, T) of the target object is determined by minimizing the re-projection errors of rays from the 3D points onto 2D points in the image. Conventional techniques require a planar checkerboard, estimating the 6 degrees of freedom (DOF) for each board pose (6N DOF), and all the 3D points of the board to be known. The traditional extrinsic parameters calibration methods require all the 3D points of the target object to be on a plane. However, when the system requires using large checkerboards (e.g. target objects), temperature variations and other environmental changes warp the checkerboards such that they are no longer planar. The measurements performed with warped checkerboards will not be accurate.

The conventional techniques find the extrinsic parameters from one camera to another by "chaining" the poses found, and calculating the transform from the first camera to the target then to the second camera by the inverse of the transform from target to the second camera. Accordingly, the conventional technique maps known 3D points (measured in mm) to 2D image points (measured in pixels). Traditional methods have error measures that are measured in 2D pixels, which are a function of camera focal length and cannot be directly compared across cameras.

On the other hand, embodiments provide a technique for determining extrinsic parameters between two cameras using a projection ray model. Given the 2D pixel locations of corresponding target points in the images, embodiments determine the half-infinite 3D rays passing through them. The 3D points of closest approach for corresponding rays (that intersect) is calculated. The relative pose between any two cameras is determined by making distance between adjacent 3D points equal to the real world value. Thus, embodiments estimate the 6 degrees of freedom (DOF) between the cameras directly regardless of how many boards are used. Embodiments require only the scalar distance between target points which do not have to be planar or regular. Embodiments will return the same results for a planar or a non-planar target object/target points. According to some embodiments, the target points can be points on an image displayed on one or more screens (e.g. television monitors). Changing the displayed image may change the plane depth of the target and, as such, embodiments work with 3D targets. Thus, embodiments also work with multiple targets without knowing the relative positioning between the targets. Embodiments map 2D image points (in pixels) to real world 3D ray intersections (e.g. in millimeters). Embodiments provide an error metric that is in physical distances (e.g. millimeters) regardless of camera focal length. The error metric can be compared directly across various cameras.

Next, the projection of rays is described in connection with FIGS. 2A-2B.

In many computer vision problems such as visual odometry (VO), simultaneous localization and mapping (SLAM) and structure from motion (SFM), the goal includes finding the function that maps a 2D image point (u,v) 202 into a half-infinite 3D ray (Rx, Ry, Rz) 204 from the camera center 206. In the ideal pinhole model for a camera, that function is written as:

$$F(u, v) \rightarrow \left(\frac{u - c_x}{f_x}, \frac{v - c_y}{f_y}, 1\right) = (R_x, R_y, R_z)$$

where $f_x$, $f_y$ are the camera focal lengths (in pixels), and ($c_x$, $c_y$) is the camera optical center (in pixels). This mapping from 2D point 202 to 3D ray 204 is shown in FIG. 2A. Using images from multiple camera positions, it is possible to recover the extrinsic transform between camera positions from the intersections of the 3D rays.

However, real cameras do not follow the pinhole model, which is merely a convenient mathematical model. The mapping function F(u, v) from points to rays is therefore more complex, mostly due to lens distortion. The 3D ray through an image point will be incorrect as light is bent at the lens. Each image point is moved/distorted from its location in an ideal pinhole model as shown FIG. 2B. Embodiments aim to obtain the undistorted image coordinates (u', v') 208 as a function of the distorted values (u, v) 212.

The conventional distortion model uses a polynomial function to map the theoretical pinhole projection points to the actual distorted points as follows:

$$(u',v')=f(u,v)=u+d_1r^2+d_2r^4+\ldots$$

where r is $\sqrt{(u^*u+v^*v)}$. This function is not invertible.

On the other hand, the ray projection discussed in connection with various embodiments uses the inverse mapping from distorted points to their undistorted form as follows:

$$(u,v)=g(u',v')=u'+d_1r+d_2r^2+\ldots$$

The diffractive optical elements (DOEs) provide the inverse mapping directly (each bright spot on the image is mapped to a ray direction). The inverse mapping is also useful for stereopsis, structure from motion, and visual odometry.

According to various embodiments, the radial and tangential distortion model may be used as a starting point:

$$(u',v')=(u(1+d_1r+d_2r^2+d_3r^3+d_4(2uv)+d_5(r^2+2u^2), v(1+d_1r+d_2r^2+d_3r^3+d_4(r^2+2v^2)+d_5(2uv))$$

where $r=\sqrt{((u-c)/f_x)^2+(v-c_y)/f_y))^2}$

This function is similar to a Taylor expansion in radial coordinates about the pinhole model. Once the points have been undistorted, the pinhole model equation may then be used to map undistorted image coordinates 208 directly to 3D rays 210. These are the inverse radial distortion coefficients that map distorted pixels to undistorted pixel positions. Ideally the focal lengths and image center are the same between the two complementary functions.

A DOE is very convenient for determining the inverse radial distortion coefficients as the diffractive orders provide the exact angle of incident light rays regardless of focal lengths. The difference in pixel coordinates with respect to the DOE pattern may be minimized to determine the inverse distortion coefficients.

FIGS. 3A-3D illustrate a series of figures corresponding to iterations on the extrinsic parameters (rotation and translation) to have corresponding rays intersect on a corresponding point of the target object. In fact, embodiments do not require a calibrated target object (e.g. a target object with all known 3D points.) According to the embodiments discussed herein, it is enough to know only the real-world distance between two 3D points for scaling purposes. The 3D points do not need to lie on a plane.

As illustrated in FIGS. 3A-3D, a first camera 310 and a second camera 320 are positioned and configured to capture a first image and a second image, respectively, of a target object 302. As explained herein, the target object 302 can be planar or non-planar. While it is not necessary to know the location of all the points of the target object 302, embodiments can determine the extrinsic parameters of the first camera 310 and the second camera 320 using a known distance between two points (e.g. two adjacent points 304, 306) of the target object 302.

According to various embodiments, a first image of the target object 302 is acquired using the first camera 310. Using the first image, a plurality of first image points (including the image point 314) are identified on an image plane 312 of the first camera 310. Each of the first image points correspond to one of a plurality of points on the target object 302. For example, as illustrated in FIGS. 3A-3D, the image point 314 corresponds to point 304 of the target object 302. That is, the image point 314 is a 2D image representing the actual 3D point 304 of the target object 302. A first set of rays (e.g. infinite half rays) originating from an optical center 308 of the first camera 310 are formed. Each ray passes through one of the plurality of first image points. For example, a first ray 316 passes through the 2D image point 314 corresponding to the actual 3D point 304 of the target object 302.

According to various embodiments, a second image of the target object 302 is acquired using the second camera 320. Using the second image, a plurality of second image points (including the image point 324) are identified on an image plane 322 of the second camera 320. Each of the second image points correspond to one of a plurality of points on the target object 302. For example, as illustrated in FIGS. 3A-3D, the image point 324 corresponds to point 304 of the target object 302. That is, the image point 324 is a 2D image representing the actual 3D point 304 of the target object 302. A second set of rays (e.g. infinite half rays) originating from an optical center 318 of the second camera 320 are formed. Each ray passes through one of the plurality of second image points. For example, a second ray 326 passes through the 2D image point 324 corresponding to the actual 3D point 304 of the target object 302. Accordingly, the second ray 326 also corresponds to the first ray 316 (e.g. they both represent the 3D point 304 of the target object 302). For the optimal extrinsic parameters (translation and rotation of the second camera 320 with respect to the first camera 310), the first ray 316 and the second ray 326 should intersect on point 304 on the target object 302.

According to various embodiments, the optical center 308 of the first camera 310 and the optical center 318 of the second camera 320 are known (e.g. the intrinsic parameters of the cameras are known, and/or calibrated).

Figure 3B:
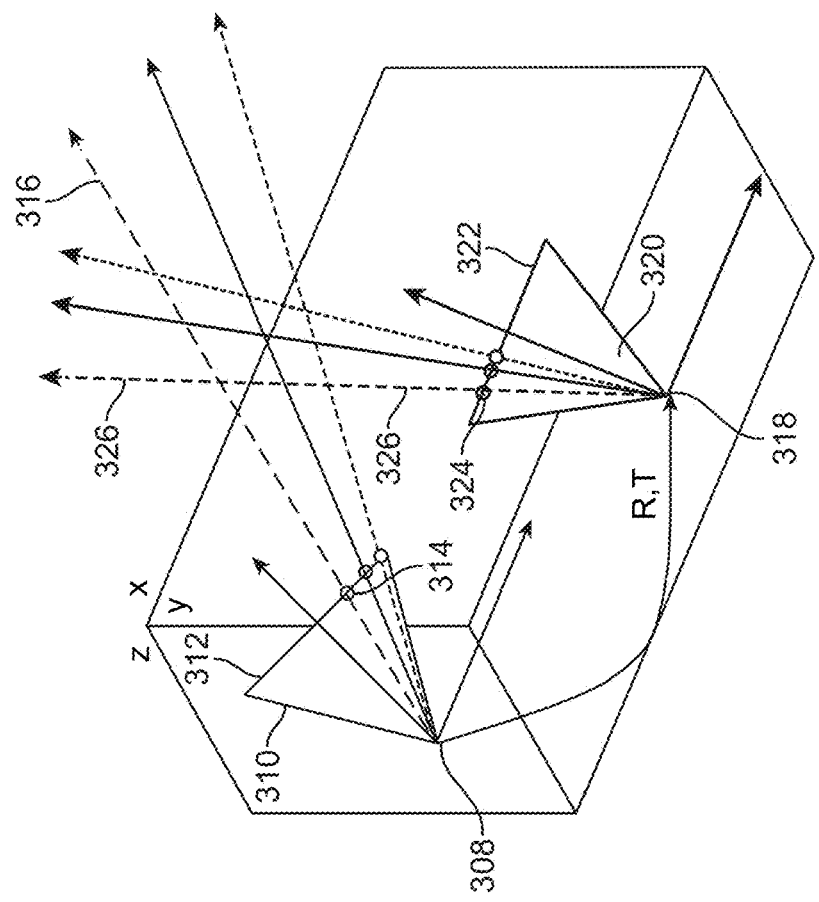
FIGS. 3A-3D illustrate relative position of two cameras during iterations on values of extrinsic parameters (rotation and translation) to have corresponding rays intersect on a corresponding 3D point according to various embodiments.
Figure 3A:
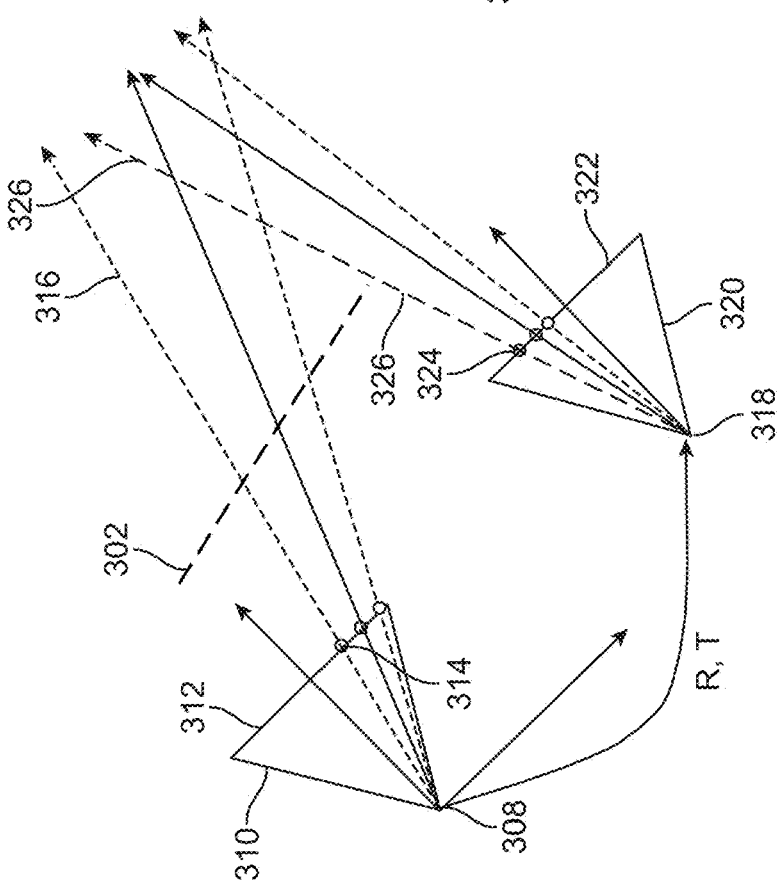
Figures 3C, 3D:
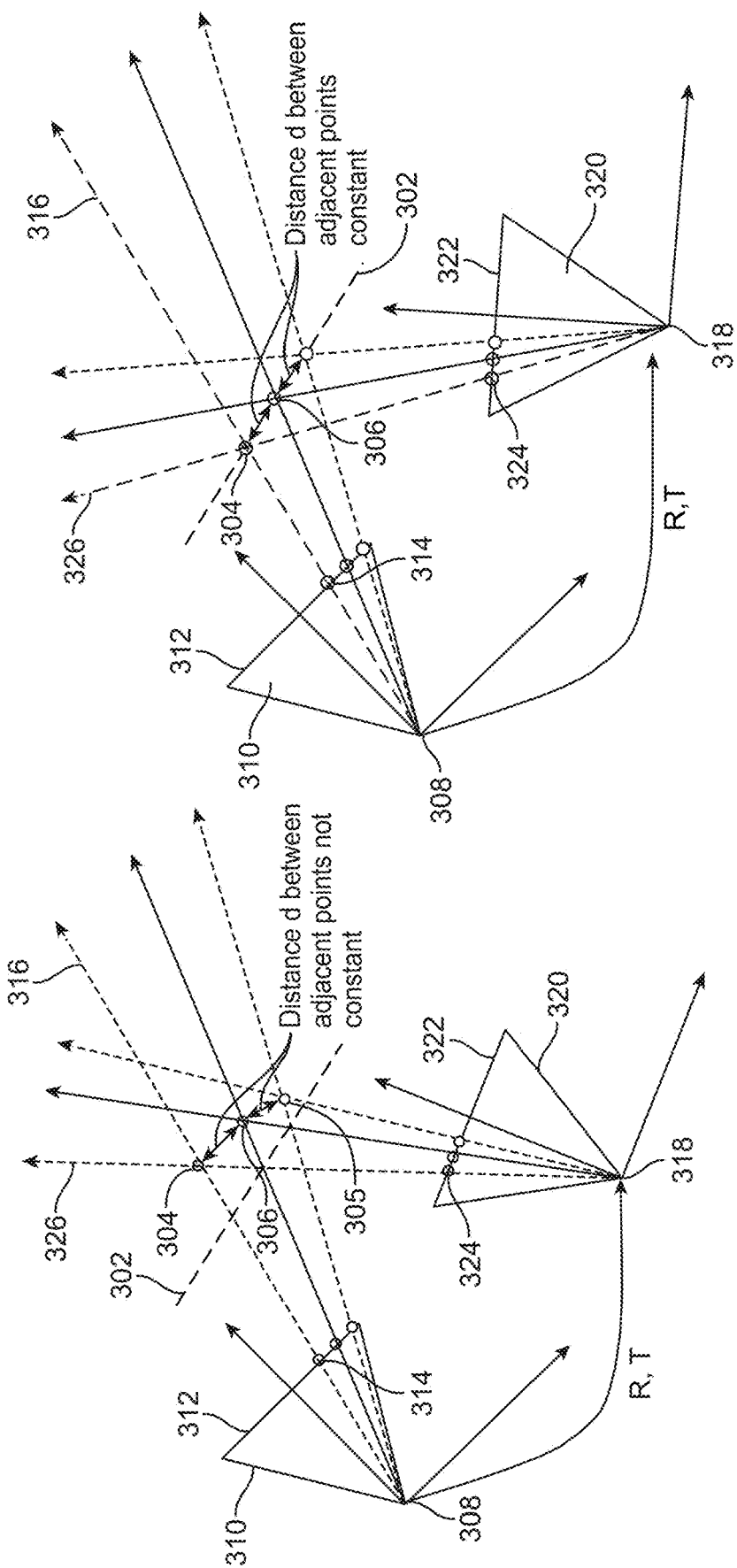

FIGS. 3A-3D illustrate three colored points (e.g., red 305, blue 306, green 304) that are visible from two camera positions. Except for certain degenerate transforms (e.g. zero translation between cameras), the 3D intersections uniquely define the rotation and translation between the cameras. When rotation and translation are not correct, the corresponding rays (e.g. the first ray 316 and the second ray 326) either do not intersect at all (as shown in FIGS. 3A and 3B—in FIG. 3B, the rays are separated by a distance in the z-direction), or intersect at points that are not the same distance apart (FIG. 3C). Only when the rotation and translation is correct, will the rays intersect in 3D space and the distance between intersections is constant (as shown in FIG. 3D).

The extrinsic parameters are calculated as follows. To determine the 6 degrees of freedom extrinsic parameters between two cameras, the 3D rays of corresponding image points of a regular planar grid pattern may be used. Each point on the regular planar grid pattern is separated by a known distance d (e.g. the square size of a checkerboard pattern). This is the only scalar parameter about the board pattern that is needed. It may be assumed that all points are on a single plane and separated by d, the exact positions of each individual point is not important. If there was no noise or error, each matching ray would intersect at a single point in 3D space, all of the intersections would be on a single 2D plane, and the distance between two adjacent intersection would always be d. These three criteria may be used to determine the extrinsic parameters: the six extrinsic parameters are found by minimizing the three corresponding error terms.

$$\min_{R,T} P(R,T) + D(R,T) + I(R,T)$$

P(R,T) is the optional planarity criterion. This component of the cost function may be removed allowing for non-planar boards (as further discussed below). It is the sum squared distance between all of the 3D intersection points and the best fit 2D plane of the points. This is equivalent to the smallest eigenvalue of the 3×3 covariance matrix of the points. This metric could be used to test if the target is actually planar.

D(R,T) is the point distance metric criterion. It is sum squared mean of all the residuals of the distance between adjacent points on the board and the known true distance d: $r_{i,j}=(d_{i,j}-d)$ where $d_{i,j}$ is the distance between adjacent points i and j on the grid and d is the expected distance.

I(R,T) is the intersection distance criterion. Ideally the 3D rays intersect at a single 3D point. However the point of closest approach may be used to the two rays since any noise would have the rays not exactly intersect in 3D space, but get close to each other at one unique place. I(R,T) then is the sum squared mean of the distance between the closest point of intersection and the two rays. If the rays actually intersect, this distance is zero.

According to various embodiments, I(R,T) may be calculated, using a first value for the rotation and translation, as a closest point of intersection between each ray of the first set of rays (e.g. the set of rays originating from an optical center of the first camera and passing through one of the image points on the image plane of the first camera) and each corresponding ray of the second set of rays (e.g. the set of rays originating from an optical center of the second camera and passing through one of the image points on the image plane of the second camera). The correspondence between the rays indicate that each ray originates from the first or the second camera, and pass through the image point on the image plane of the respective cameras corresponding to the same point of the target object. The corresponding rays are of the same color (Red, Green or Blue) as illustrated in FIGS. 3A-3D. For example, the rays 316 and 326 are of the same color as the corresponding image point 304 (e.g. green).

According to various embodiments, D(R,T) may be calculated, using a first value for the rotation and translation, as a residual between a distance between adjacent closest points of intersection between adjacent rays and an actual distance between adjacent points of the plurality of points on the target object.

Embodiments determine a value for the extrinsic parameters that reduces the closest point of intersection and the residual by calculating the I(R,T) and D(R,T) for various values for the rotation and translation parameters. That is, the optimal I(R,T) and D(R,T) are determined by iterating on the rotation and translation parameters. The first ray of the first set of rays and the corresponding second ray of the second set of rays intersect on the target object when the closest point of intersection and the residual is minimized.

Embodiments may be implemented using any type of target object. The target object can be planar or non-planar. Small warping or curvature of the target is not significant. In some embodiments, a curved target may be used for wide field of view cameras. In addition, it is not necessary to know the exact location of all points of the target object. It is enough to know the distance between two points (e.g. two adjacent points) on the target object in order to be able to determining a scale factor for the extrinsic parameters using the known distance value between the two points on the target object. As discussed above, the relative camera pose (R,T) is found by optimizing for the known distance between adjacent target points.

In conventional techniques, the error in rotation and translation (R,T) is measured as the root mean square (RMS) of pixel differences (in units of pixels) between expected and actual image locations. Accordingly, in conventional techniques, the pixel RMS is dependent on camera intrinsic parameters and not directly related to a real world metric. An image with twice the number of pixels may have larger 'error' for the same pose uncertainty.

Figure 4:
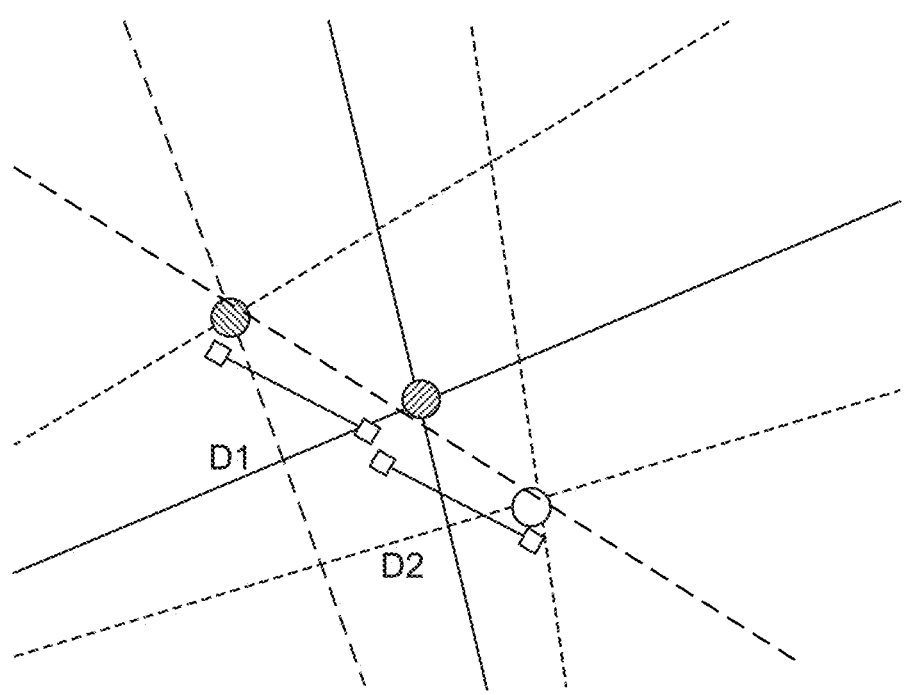
FIG. 4 illustrates physical distance between 3D points used for extrinsic calibration of one or more cameras according to various embodiments.

On the other hand, as illustrated in FIG. 4, according to the embodiments discussed herein, the ray projection error is measured as the RMS of physical distance between 3D points (in units of millimeters). Accordingly, embodiments are generally directed to finding a collection of 3D points in space. The 3D points can be fit to a 3D plane (e.g. a 3D plane of a target object) and the variance used to determine if the target object is warped or planar. According to various embodiments, for the correct rotation and translation (R,T) values, the error may be less than 1 millimeter.

FIGS. 5A-9 illustrate different exemplary use cases for determining extrinsic parameters of cameras according to various embodiments.

Figure 5A:
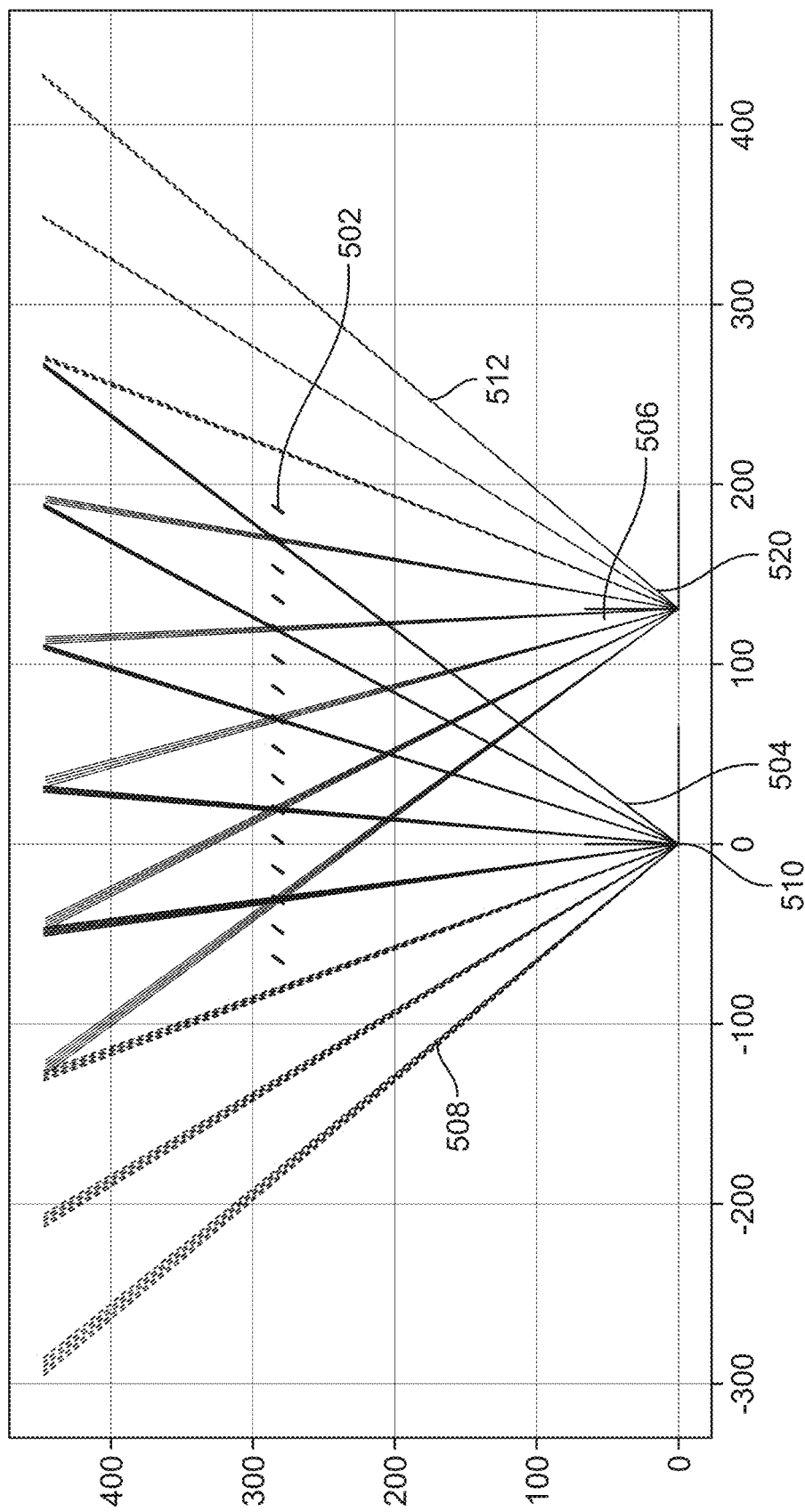
FIG. 5A illustrates a first exemplary use case including two cameras and one target object according to various embodiments.

FIG. 5A illustrates a first exemplary use case including two cameras and one target object. Two world cameras may be calibrated using a single DOE image. The inverse distortion coefficients may be determined along with camera center and focal lengths. A single image of a target object (e.g. checkerboard) visible in both cameras may be used for extrinsic calibration as discussed for example in connection with FIGS. 3A-3D.

FIG. 5A illustrates, in X-Z plane, the computed relative positions of the two cameras (e.g. the first camera 510 and the second camera 520) and a subset of the intersecting rays at the board position. All of the intersections 502 are shown as dots which lie on a plane in 3D. The slight tilt with respect to the cameras makes the points form small diagonal lines when projected onto X-Z plane. The first set of rays 504 projected from the first camera 510 and the second set of rays 506 projected from the second camera 520 have intersections while the third set of rays 508 and the fourth set of rays 512 are visible from only one camera (e.g. the first camera 510 or the second camera 520, respectively).

Figure 5B:
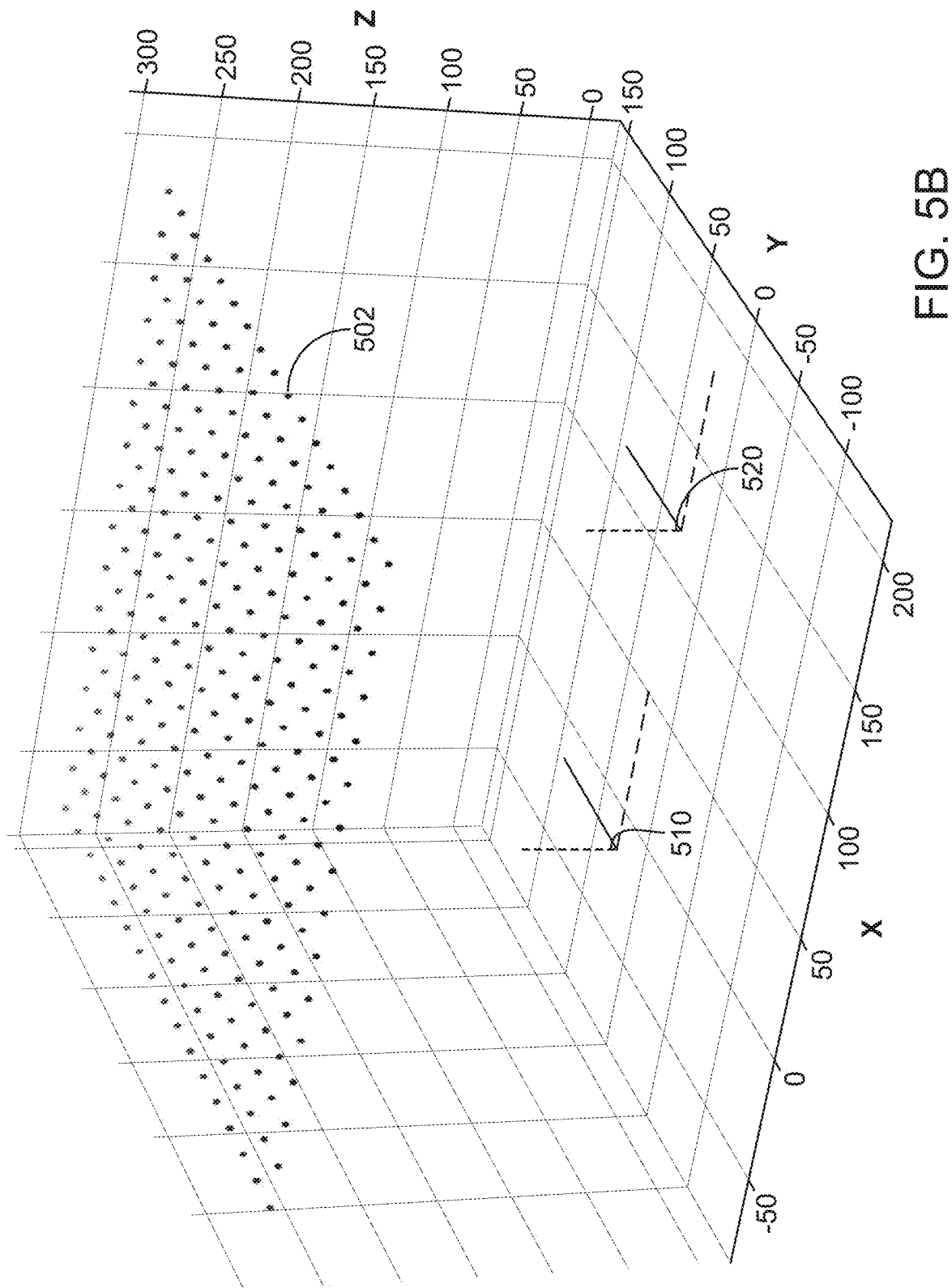
FIG. 5B illustrates the 3D plot of the cameras and ray intersections of the first use case illustrated in FIG. 5A according to various embodiments.

FIG. 5B illustrates the 3D plot of the cameras (the first camera 510 and the second camera 520) and ray intersections 502, showing that the intersections 502 all lie on a flat 2D plane with uniform spacing, corresponding to the corners of the target object.

Figure 6:
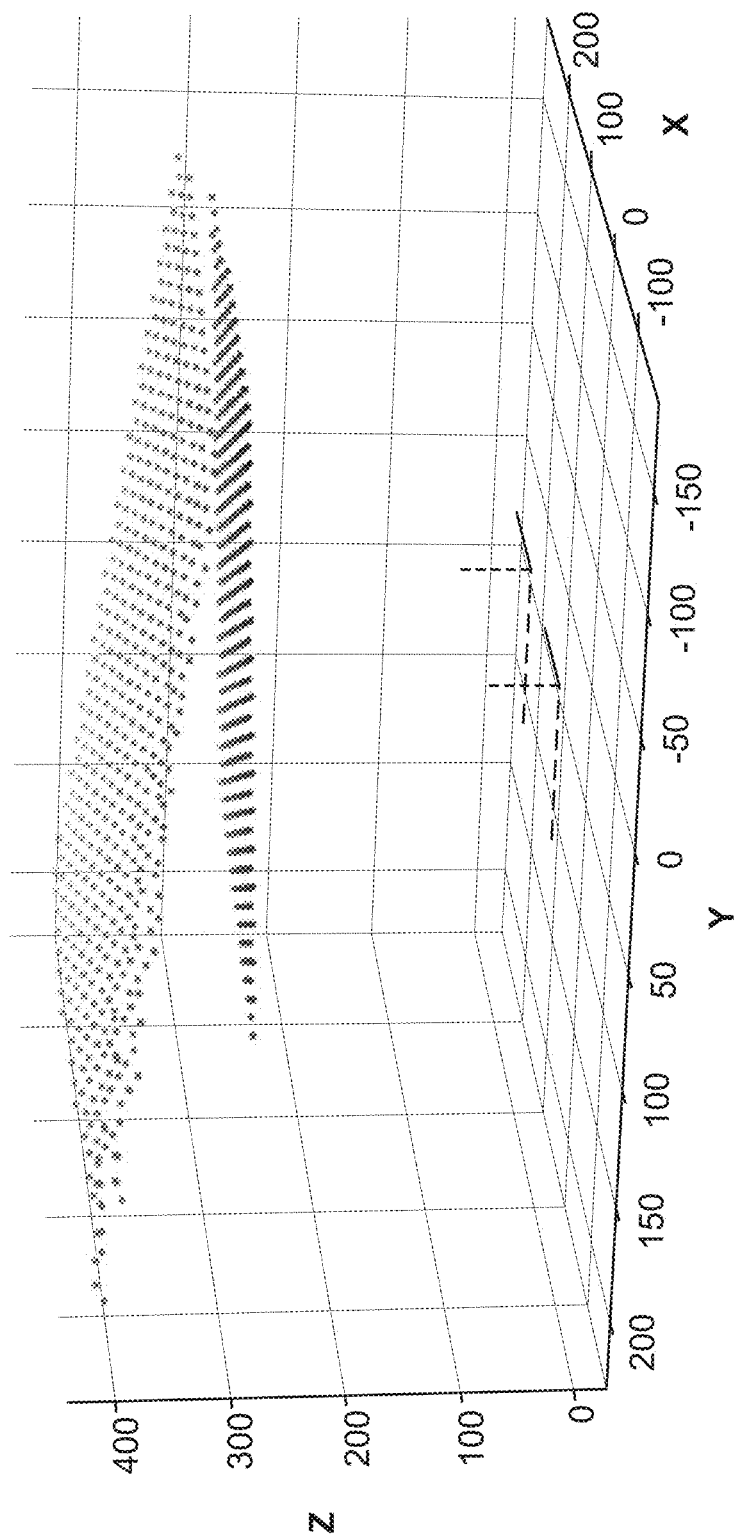
FIG. 6 illustrates a second exemplary use case including two cameras and multiple target objects according to various embodiments.

FIG. 6 illustrates a second exemplary use case including two cameras and multiple target objects. In some embodiments, two target objects may be used. For example, the same target object may be placed in two different orientations, and two pairs of images are obtained at different orientations of the target object. The same number of minimization parameters, the six degrees of freedom, are used regardless of the number of views included. The relative poses of the target objects could be deduced by the intersection points if needed.

Figure 7B:
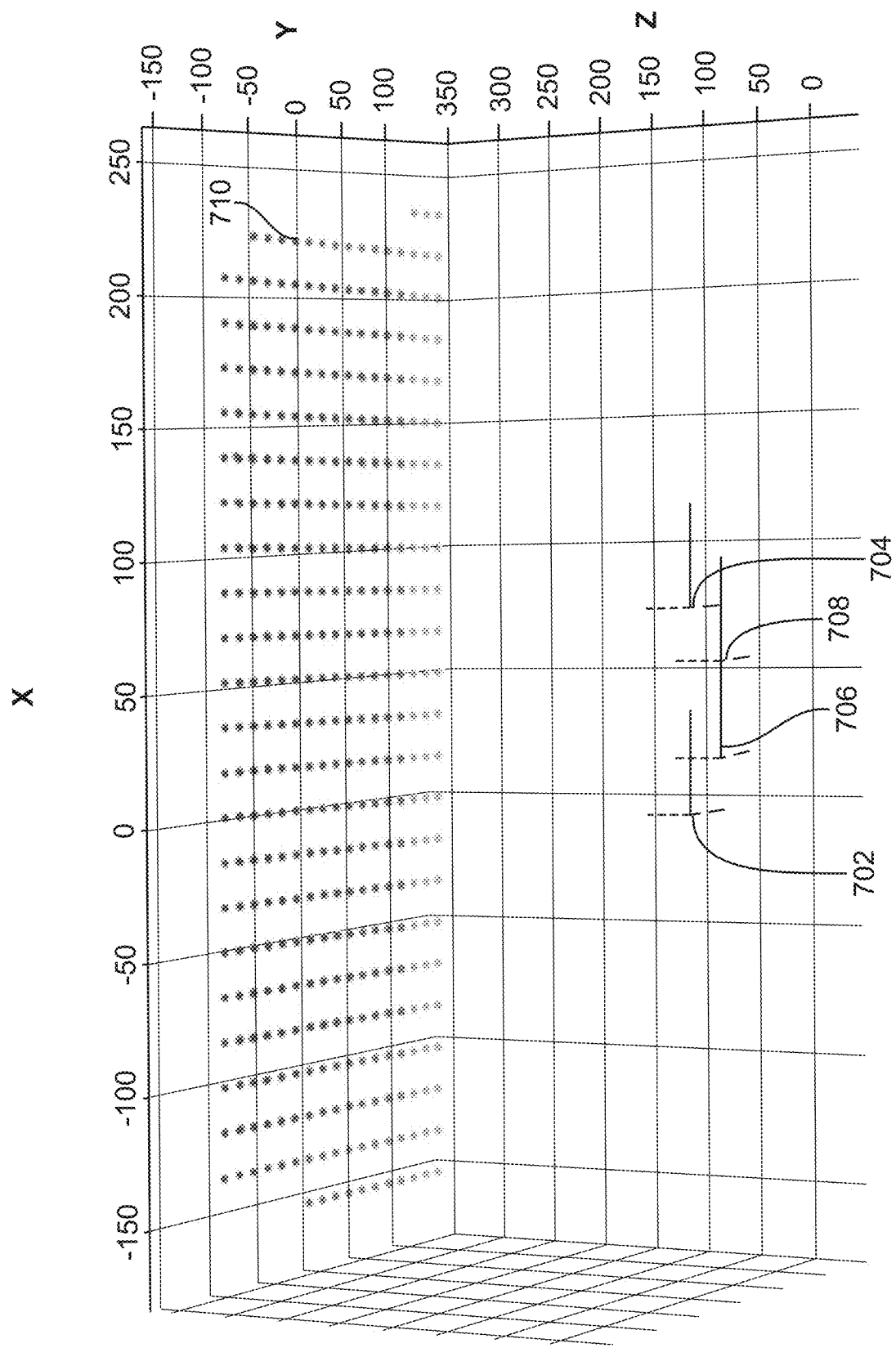

FIGS. 7A-7B illustrate a third exemplary use case including four cameras 702, 704, 706 708 and one target object. For example, the four cameras may include two world cameras and two eyepiece cameras that have a common view of a single target object. The eyepiece cameras may have longer fields of view compared to the world cameras. FIG. 7B illustrates the 3D plot of the cameras and ray intersections, showing that the intersections 710 all lie on a flat 2D plane with uniform spacing, corresponding to the corners of the target object.

Table 1 illustrates comparing the calibration results from the conventional calibration technique (Method C) for three exemplary devices. The projection ray method (method PR according to the embodiments described herein) used one DOE image for calibration of intrinsic parameters and one board image for calibration of extrinsic parameters.

TABLE 1

Comparison of calibration results

| Device | Method | Camera | fx | fy | cx | cy | Translation (mm) | | |
|---|---|---|---|---|---|---|---|---|---|
| 1 | C | 1 | 449.7 | 449.75 | 324.509 | 245.312 | 132.796 | 0.77183 | 0.63169 |
|  | PR | 1 | 449.64 | 449.654 | 323.46 | 244.583 | 131.638 | 0.40466 | 0.04218 |
|  | C | 2 | 449.49 | 449.574 | 323.738 | 233.181 |  |  |  |
|  | PR | 2 | 449.67 | 449.806 | 323.786 | 231.426 |  |  |  |
| 2 | C | 1 | 450.29 | 450.377 | 317.032 | 243.11 | 132.666 | −1.29554 | 0.56018 |
|  | PR | 1 | 450.34 | 450.461 | 316.932 | 244.476 | 131.878 | −1.57552 | 0.37762 |
|  | C | 2 | 449.58 | 449.779 | 320.824 | 234.76 |  |  |  |
|  | PR | 2 | 449.55 | 449.822 | 321.132 | 232.742 |  |  |  |
| 3 | C | 1 | 450.43 | 450.565 | 324.767 | 244.68 | 132.785 | −0.6697 | 0.16008 |
|  | PR | 1 | 450.28 | 450.386 | 324.807 | 243.618 | 131.682 | −0.85845 | 0.21398 |
|  | C | 2 | 449.54 | 449.619 | 322.193 | 232.276 |  |  |  |
|  | PR | 2 | 449.72 | 449.822 | 322.045 | 232.466 |  |  |  |

As mentioned above, of the three components of the cost function in the minimization, the planarity constraint is not actually required to solve for the extrinsic parameters. If the board is slightly out of plane, then up to second order the distance constraint remains valid. The distance constraint provides the only metric based on a physical feature of the board to the minimization. In theory any board where the ordered adjacent points have a known fixed distance can be used. The points do not have to be on a plane. The extrinsic parameters on the devices above were re-estimated with the planarity cost function removed. It resulted in small differences to the estimated extrinsic parameters, as illustrated in Table 2 shown in FIG. 13, which is a table illustrating estimated extrinsic parameters and the effect of the planarity constraint according to various embodiments.

The resulting positions of the ray intersections are slightly different as the minimization was no longer trying to make the points planar. The resulting intersection points were then projected onto their principle components by finding the eigenvectors of their first moments. This resulted in three eigenvectors with two in the best fitting plane and the third normal to the plane. The resulting eigenvalues showed the points to be very planar. The remapped points were then fit to a paraboloid function where the principal curvatures can be calculated from the Hessian matrix. When using 10 images of the same board at slightly different positions the principal curvatures are all very close.

It is also possible to improve the accuracy by increasing the number of board poses. Images from two eye proxy cameras separated by 62 mm were used to calculate the relative pose of the two cameras. The calculations were done multiple times using 1, 3, 4 and 5 different poses of the target board (there were 45 different board pose images to choose from). Random subsets of the pose images were used to get the different number of poses. The results for the ray projection method are shown in Table 3 in FIG. 14, which is a table illustrating results for the ray projection method and the effect of multiple poses according to various embodiments. As the number of poses is increased the variation across runs is reduced. It appears that using more than four poses results in little improvement in accuracy.

FIG. 8 illustrates an exemplary table 800 showing the extrinsic parameters for two world cameras using the conventional technique 802 and the technique 804 described herein according to various embodiments. Three different target object positions were used, images from each position are taken 5 times (e.g. 15 total measurements are made). Results shown in FIG. 8 illustrate that the mean and standard deviation across the 15 measurements.

FIG. 9 illustrates a table 900 showing exemplary extrinsic parameters for two cameras using the conventional technique 902 and the technique 904 described herein using a warped target object 910 and a planar target object 920 according to various embodiments. Each set was run 5 times per target object, each run had 5 poses of the target object. Mean values across the 5 runs for each set are shown in FIG. 9. The technique 904 described herein calculates the variance from planar of the found 3D intersections which can be used to judge the flatness of the target object.

As provided above, the technique described herein only requires knowing the scalar distance between adjacent 3D target points. Therefore the target containing the 3D points does not have to be planar. The target object can have any shape as long as distances between two target points are known. Curved targets like cylinders or semi-spheres would work as the points are not planar but are still fixed distances apart. For example, as illustrated in FIG. 10, cameras 1002, 1004 in an optical device will each have partial overlapping field of view of the target object. Cameras with no overlap in their field of view could still be calibrated using a semi-cylinder or semi-sphere target 1006, according to various embodiments.

Figure 11:
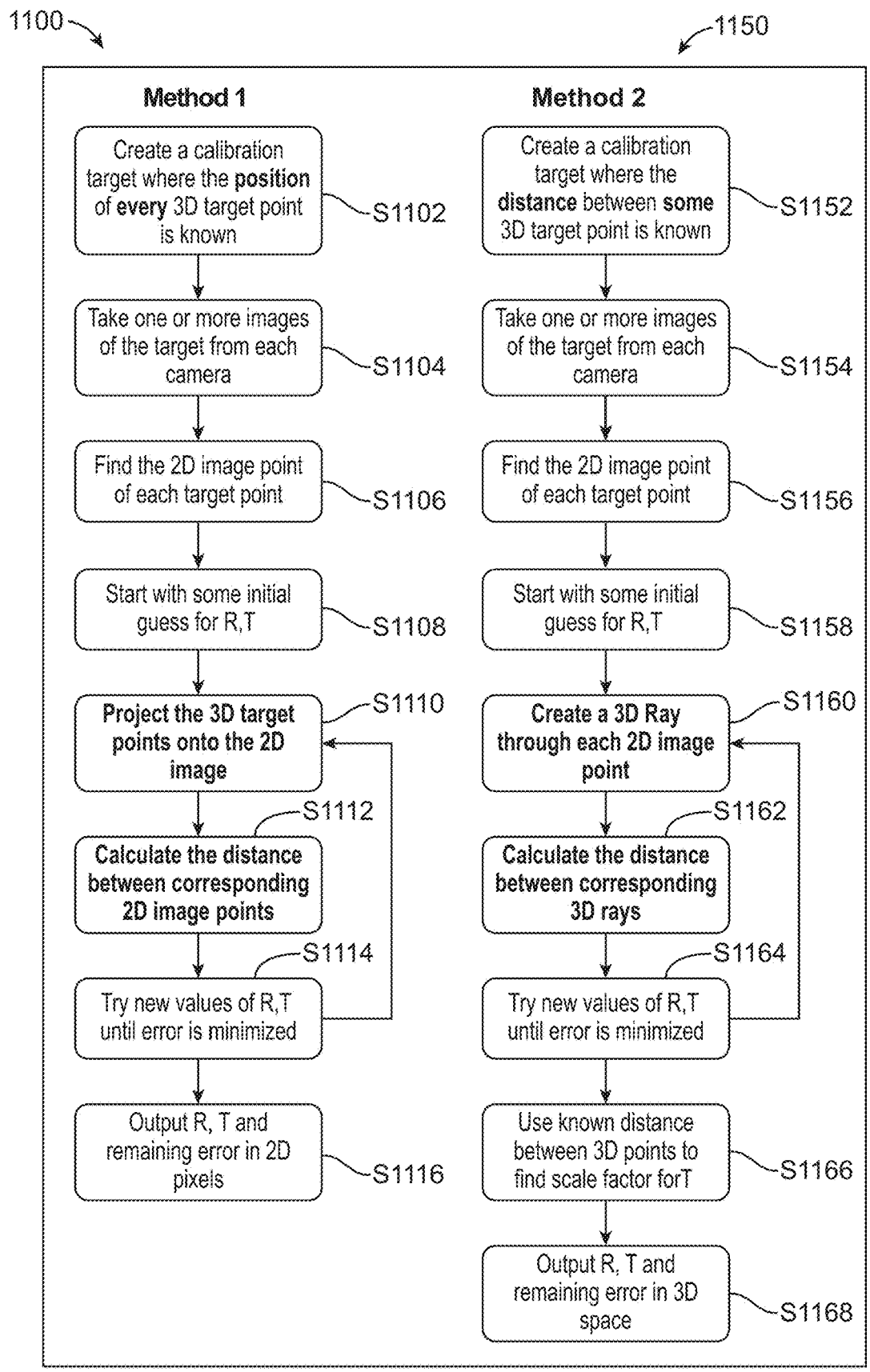
FIG. 11 shows two flowcharts illustrating methods of determining rotation and translation according to various embodiments.

FIG. 11 shows two flowcharts illustrating methods of determining rotation and translation according to various embodiments.

According to first method 1100, a calibration target object with known 3D points is created at step S1102. The position of every 3D point on the target object is generally known.

One or more images of the target object is taken using each camera that is to be extrinsically calibrated at step S1104. The 2D image point on the image plane of each camera is determined using the images of the target object at step S1106. Each 2D image corresponds to a 3D point of the target object. An initial value is assigned to the rotation and translation (R, T) parameters at step S1108. The 3D points of the target object are projected onto the 2D image acquired by each camera at step S1110. The distance between corresponding 2D image points are calculated at step S1112. The error is then minimized by iterating the projecting and calculating steps for different R, T values at step S1114. The final determined R, T values are output along with the remaining error in 2D pixels at step S1116.

In another method, illustrated by second method 1150 described herein, a calibration target is created with a known distance between two or more 3D target points at step S1152. It is not necessary to know the location of every 3D point on the target object. One or more images of the target object is taken using each camera that is to be extrinsically calibrated at step S1154. The 2D image point on the image plane of each camera is determined using the images of the target object at step S1156. Each 2D image corresponds to a 3D point of the target object. An initial value is assigned to the rotation and translation (R, T) parameters at step S1158. A 3D ray is created from the optical center of each camera that passes through each 2D image point of the camera at step S1160. The distance between corresponding 3D rays is calculated at step S1162. The error is then minimized by iterating the projecting and calculating steps for different R, T values at step S1164. The known distance between 3D points of the target object is used to find a scale factor for the translation parameter at step S1166. The final determined R, T values are output along with the remaining error in 3D space (e.g., in millimeters) at step S1168.

Figure 12:
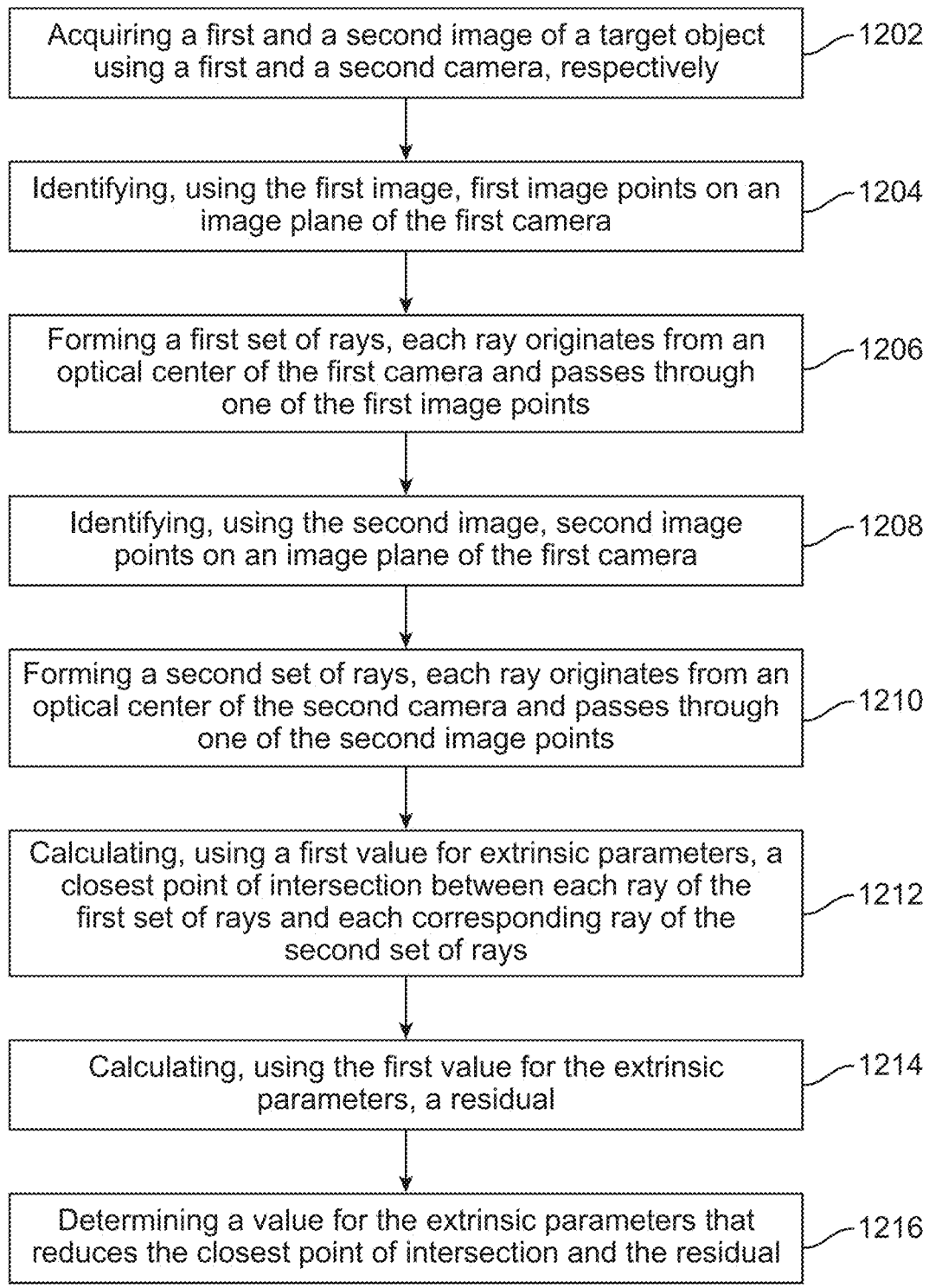
FIG. 12 shows a simplified flowchart for determining extrinsic parameters of one or more cameras using a ray intersection technique according to various embodiments.

FIG. 12 shows a simplified flowchart for determining extrinsic parameters of one or more cameras using ray intersection technique according to various embodiments. The extrinsic parameters include rotation or translation of a second camera with respect to a first camera.

At step 1202, a first image of a target object is acquired using the first camera, and a second image of the target object is acquired using the second camera. According to various embodiments, the target object may be planar, or non-planar. In some embodiments, the target object may be formed of a plurality of individual, distinct objects, such as a plurality of images formed on a plurality of screens. According to various embodiments, a known distance value between any two points on the target object is used to determine a scale factor for the extrinsic parameters.

At step 1204, a plurality of first image points are identified on an image plane of the first camera. Each of the plurality of first image points correspond to one of a plurality of points on the target object. For example, this is illustrated in FIG. 3D as the green, blue and red 2D points on the image plane of the first camera and the green, blue, and red 3D points on the target object.

At step 1206, a first set of rays (e.g. half-infinite 3D rays) are formed such that each ray originates from an optical center of the first camera and passes through one of the plurality of first image points. For example, this is illustrated in FIG. 3D as the green ray 316 originating from the optical center 308 of the first camera 310 and passing through the green 2D point 314 on the image plane 312 of the first camera 310.

At step 1208, a plurality of second image points are identified on an image plane of the second camera. Each of the plurality of second image points correspond to one of a plurality of points on the target object. For example, this is illustrated in FIG. 3D as the green, blue and red 2D points on the image plane of the second camera and the green, blue, and red 3D points on the target object.

At step 1210, a second set of rays (e.g. half-infinite 3D rays) are formed such that each ray originates from an optical center of the second camera and passes through one of the plurality of second image points. For example, this is illustrated in FIG. 3D as the green ray 326 originating from the optical center 318 of the second camera 320 and passing through the green 2D point 324 on the image plane 322 of the second camera 320. A first ray among the first set of rays corresponds to a second ray among the second set of rays when the first ray and the second ray pass through image points on respective image planes of the first camera and the second camera that correspond to a same point on the target object. For example, this is illustrated in FIG. 3D as the first ray 316 and the second ray 326, which correspond to the green 2D point on the image plane of the respective cameras, which in turn corresponds to the green 3D point on the target object.

At step 1212, a closest point of intersection between each ray of the first set of rays and each corresponding ray of the second set of rays using a first value for extrinsic parameters. The closest point of intersection may be calculated as root mean square of all squared values for closest point of intersections.

At step 1214, a residual between (a) a distance between adjacent closest points of intersection between adjacent rays and (b) an actual distance between adjacent points of the plurality of points on the target object is calculated using the first value for extrinsic parameters. The residual may be calculated as root mean square of all squared values for residuals Steps 1212-1214 may be repeated for different values of the extrinsic parameters until a value for the extrinsic parameters is determined to reduce the closest point of intersection and the residual (step 1216). The first ray and the second ray intersect on the target object when the closest point of intersection and the residual is minimized. For example, steps 1212-1214 may be repeated until a value for the closest point of intersection between each ray of the first set of rays and each corresponding ray of the second set of rays is zero. Different values of the extrinsic parameters may rotate and/or translate the second camera with respect to the first camera.

Once determined, the extrinsic parameters and a final value for the closest point of intersection and the residual may be output using an output device (e.g. a display device).

It should be appreciated that the specific steps illustrated in FIG. 12 provide a particular method for determining extrinsic parameters of one or more cameras according to some embodiments. Other sequences of steps may also be performed according to alternative embodiments. For example, alternative embodiments may perform the steps outlined in FIG. 12 in a different order. Moreover, the individual steps illustrated in FIG. 12 may include multiple sub-steps that may be performed in various sequences as appropriate to an individual step. Furthermore, additional steps may be added or removed depending on the particular applications. One of ordinary skill in the art would recognize many variations, modifications, and alternatives.

Embodiments described herein may be used at a factory/manufacturing setting to calibrate real-world cameras of a headset (e.g. an AR/VR headset), such as one illustrated in FIGS. 1A-1B. Alternatively or in addition, embodiments may also be performed by a user of the headset prior to initial use or as required during the lifetime of the headset. Upon receiving the headset, the user may perform extrinsic calibration using two points (the distance therebetween being known) on, for example, other components of the AR/VR system, such as a belt pack, or a hand-held totem. One or more of the components may be provided with two points thereon (e.g. a green and a red/blue point). A distance between the two points may be provided to the user. The user may take a picture of the two points on the component (e.g. belt pack or the hand-held totem). The world-cameras of the headset may then be extrinsically calibrated using the techniques described herein. In some embodiments, the two points of the component may be the two LED lights of the hand-held totem.

Embodiments provide a number of advantages over prior systems. Embodiments allow for extrinsic calibration of one or more cameras using ray intersection technique described herein. According to the embodiments, target 3D points are used for extrinsic calibration. While the 3D points can be provided on a target object, it is not required to know the location of each and every 3D point of the target object. In addition, there is no requirement for the target object to be planar, or the target 3D points to lie on a plane. Extrinsic calibration of the cameras may be performed using non-planar target object(s).

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of determining extrinsic parameters for a plurality of cameras, the method comprising:
    acquiring a first image of a target object using a first camera of the plurality of cameras;
    acquiring a second image of the target object using a second camera of the plurality of cameras;
    identifying, using the first image, a plurality of first image points on an image plane of the first camera, wherein each of the plurality of first image points correspond to one of a plurality of points on the target object;
    forming a first set of rays, wherein each ray of the first set of rays originates from an optical center of the first camera and passes through one of the plurality of first image points;
    identifying, using the second image, a plurality of second image points on an image plane of the second camera, wherein each of the plurality of second image points correspond to one of the plurality of points on the target object;
    forming a second set of rays, wherein each ray of the second set of rays originates from an optical center of the second camera and passes through one of the plurality of second image point, wherein a first ray among the first set of rays corresponds to a second ray among the second set of rays when the first ray and the second ray pass through image points on respective image planes of the first camera and the second camera that correspond to a same point on the target object;
    calculating, using a first value for extrinsic parameters, a closest point of intersection between each ray of the first set of rays and each corresponding ray of the second set of rays;
    calculating, using the first value for the extrinsic parameters, a residual between:
        a distance between adjacent closest points of intersection between adjacent rays; and
        an actual distance between adjacent points of the plurality of points on the target object; and
    determining a value for the extrinsic parameters that reduces the closest point of intersection and the residual.

2. The method of claim 1, wherein the first ray and the second ray intersect on the target object when the closest point of intersection and the residual is minimized, wherein the first ray and the second ray correspond to a same color.

3. The method of claim 1, further comprising:
    receiving a known distance value between any two points on the target object; and
    determining a scale factor for the extrinsic parameters using the known distance value between the two points on the target object.

4. The method of claim 1, wherein determining the value for the extrinsic parameters that reduces the closest point of intersection and the residual includes repeating the calculating steps for one or more different values of the extrinsic parameters until a value for the closest point of intersection between each ray of the first set of rays and each corresponding ray of the second set of rays is zero.

5. The method of claim 1, wherein a second value for the extrinsic parameters rotates or translates the second camera with respect to the first camera.

6. The method of claim 1, wherein the extrinsic parameters include rotation or translation of the second camera with respect to the first camera.

7. The method of claim 1, further comprising:
    outputting the extrinsic parameters and a final value for the closest point of intersection and the residual.

8. The method of claim 1, wherein the target object is non-planar.

9. The method of claim 1, wherein the target object is formed of a plurality of individual, distinct objects.

10. The method of claim 1, wherein the closest point of intersection is calculated as root mean square of all squared values for closest point of intersections and the residual is calculated as root mean square of all squared values for residuals.

11. A system for determining extrinsic parameters for a plurality of cameras comprising:
- a first camera configured to acquire a first image of a target object and form a first set of rays, wherein each ray of the first set of rays originates from an optical center of the first camera and passes through one of a plurality of first image points on an image plane of the first camera, wherein each of the plurality of first image points correspond to one of a plurality of points on the target object;
- a second camera configured to acquire a second image of the target object and form a second set of rays, wherein each ray of the second set of rays originates from an optical center of the second camera and passes through one of a plurality of second image points on an image plane of the second camera, wherein each of the plurality of second image points correspond to one of the plurality of points on the target object, wherein a first ray among the first set of rays corresponds to a second ray among the second set of rays when the first ray and the second ray pass through image points on respective image planes of the first camera and the second camera that correspond to a same point on the target object;
- a processor coupled to the first camera and second camera configured to execute instructions to:
  - calculate, using a first value for extrinsic parameters, a closest point of intersection between each ray of the first set of rays and each corresponding ray of the second set of rays;
  - calculate, using the first value for the extrinsic parameters, a residual between:
    - a distance between adjacent closest points of intersection between adjacent rays; and
    - an actual distance between adjacent points of the plurality of points on the target object; and
  - determine a value for the extrinsic parameters that reduces the closest point of intersection and the residual.

12. The system of claim 11, wherein the first ray and the second ray intersect on the target object when the closest point of intersection and the residual is minimized, wherein the first ray and the second ray correspond to a same color.

13. The system of claim 11, wherein the processor is further configured to execute instructions to:
- receive a known distance value between any two points on the target object; and
- determine a scale factor for the extrinsic parameters using the known distance value between the two points on the target object.

14. The system of claim 11, wherein determining the value for the extrinsic parameters that reduces the closest point of intersection and the residual includes repeating the calculating steps for one or more different values of the extrinsic parameters until a value for the closest point of intersection between each ray of the first set of rays and each corresponding ray of the second set of rays is zero.

15. The system of claim 11, wherein a second value for the extrinsic parameters rotates or translates the second camera with respect to the first camera.

16. The system of claim 11, wherein the extrinsic parameters include rotation or translation of the second camera with respect to the first camera.

17. The system of claim 11, wherein the processor is further configured to execute instructions to:
- output the extrinsic parameters and a final value for the closest point of intersection and the residual.

18. The system of claim 11, further comprises the target object, wherein the target object is non-planar.

19. The system of claim 11, further comprises the target object, wherein the target object is formed of a plurality of individual, distinct objects.

20. The system of claim 11, wherein the closest point of intersection is calculated as root mean square of all squared values for closest point of intersections and the residual is calculated as root mean square of all squared values for residuals.

* * * * *